United States Patent [19]
Igarashi et al.

[11] Patent Number: 6,061,253
[45] Date of Patent: May 9, 2000

[54] VARIABLE FREQUENCY SOFT SWITCHING POWER SUPPLY WITH REDUCED NOISE AND IMPROVED POWER FACTOR

[75] Inventors: Seiki Igarashi; Akio Suzuki, both of Tokyo, Japan

[73] Assignee: Fuji Electrical Co., Ltd., Japan

[21] Appl. No.: 09/204,456

[22] Filed: Dec. 3, 1998

[30] Foreign Application Priority Data

Dec. 3, 1997 [JP] Japan ................................. 9-332820

[51] Int. Cl.[7] .............................................. H02M 3/335
[52] U.S. Cl. ................................. 363/19; 363/21
[58] Field of Search .................. 363/19, 18, 21

[56] References Cited

U.S. PATENT DOCUMENTS 4,926,303  5/1990  Sturgeon ................................. 363/19
4,985,818  1/1991  Niederreiter ............................ 363/19

*Primary Examiner*—Shawn Riley
*Attorney, Agent, or Firm*—Morrison Law Firm

[57] ABSTRACT

A switching power supply uses zero-current and zero-voltage switching to reduce switching noise. A main switch and an auxiliary switch channel current and voltage between various component paths to maintain a DC output voltage while switching in zero-current or zero-voltage states. Switch ON-OFF time ratios are controlled with a simple scheme to improve the circuit power factor. The switching rate can be set to arbitrary frequencies, with switch ON time and OFF time being controlled independently. This scheme permits efficient driving of a load that is substantially less than the rated load, as generally found in portable TV circuits. The switches and control functions can be implemented on an integrated circuit.

17 Claims, 12 Drawing Sheets

Prior Art

VARIABLE FREQUENCY SOFT SWITCHING POWER SUPPLY WITH REDUCED NOISE AND IMPROVED POWER FACTOR

BACKGROUND OF THE INVENTION

The present invention relates to a switching power supply that delivers electric power from a DC power supply to a DC load via a transformer.

Referring to FIG. 19, a conventional fly-back-type switching power supply includes a bridge rectifier Rec that rectifies an AC input and produces pulsating DC power. The pulsating DC power passes through an input reactor L1 and a series diode D4 to a primary winding N1 of a transformer Tr. A switch Q1 is connected in series with primary winding N1. The series combination including input reactor L1, switch Q1 and primary winding N1 is connected in parallel with bridge rectifier Rec. A capacitor C1, preferably an electrolytic capacitor, is connected in parallel with the series combination of primary winding N1 and switch Q1. A snubber capacitor Cs is connected in parallel with switch Q1. A switch Q3 is connected between the output of input reactor L1 and a common connection of bridge rectifier Rec.

When switch Q1 is ON, energy is stored in primary winding N1. When switch Q1 is OFF, stored energy is released through a secondary winding N2. The output voltage is regulated by controlling the ON and OFF times of switch Q1.

In the circuit of FIG. 19, so-called soft switching (zero voltage switching), causes switch Q1 to switch ON when the voltage across snubber capacitor Cs is at its lowest value. This is accomplished by selecting values of the leakage inductance of primary winding N1 and the capacitance of snubber capacitor Cs so that these elements resonate at the switching speed. Soft switching reduces power loss and improves noise suppression.

Switch Q3 is switched ON to produce input current flow through input reactor L1. The input current flow improves the power-factor of the circuit. When switch Q3 is switched ON, energy stored in the input reactor L1 is fed to electrolytic-type capacitor C1. Switching switch Q3 ON and OFF improves the power-factor even when the input voltage is low, since input current flows whenever the switching power supply is operating.

The OFF-period of switch Q1 is set to a length of time determined by the resonant frequency of the series combination of the leakage inductance of primary winding N1 and snubber capacitor Cs. The OFF-period of switch Q1 must be related to the resonant frequency to produce soft switching in the switching power supply of FIG. 19. In contrast, the output voltage is regulated only by the ON-period of switch Q1. Since the ON-period and the OFF-period of switch Q1 are governed by different criteria, the switching frequency of switch Q1 must therefore vary to regulate the output voltage while maintaining soft switching.

Switching power supplies used in television sets and display devices have switching frequencies that are generally synchronized with the deflection frequency. Therefore, a conventional switching power supply that depends on its switching frequency to regulate output voltage is not useful in such variable frequency applications.

The use of two separate switches Q1, Q3 for voltage regulation and power-factor improvement respectively, increases the noise level of the resulting output of the switching power supply. In addition, diode D4 in series with switch Q1 causes a voltage drop when current flows and decreases the switching power supply efficiency.

OBJECTS AND SUMMARY OF THE INVENTION

In view of the foregoing, it is an object of the present invention to provide a switching power supply which overcomes the above-described drawbacks of the prior art. It is a further object of the present invention to provide a switching power supply that facilitates soft switching, at arbitrary frequencies, has an improved power factor and offers improved efficiency when driving lighter than rated loads.

It is a yet further object of the present invention to provide a switching power supply with switches and control circuits that are integrated into a single integrated circuit.

Briefly stated, the present invention provides a switching power supply that uses zero-current and zero-voltage switching to reduce switching noise. A main switch and an auxiliary switch channel current and voltage between various component paths to maintain a DC output voltage while switching in zero-current or zero-voltage states. Switch ON-OFF time ratios are controlled with a simple scheme to improve the circuit power factor. The switching rate is set to arbitrary frequencies, with switch ON time and OFF time being controlled independently. Conventional losses in efficiency when driving a load substantially less than the rated load are avoided. The switches and control functions can be implemented on an integrated circuit, reducing size and improving efficiency. Thus a flexible, simple design improves efficiency while reducing noise and manufacturing costs.

According to an embodiment of the invention, a main switch with a snubber capacitor in parallel are connected to a leg of a primary winding of a transformer. A series circuit consisting of a resonance capacitor, a resonance reactor and an auxiliary switch is connected across the main switch. An input reactor is connected between the input power source and the primary winding. An input capacitor is connected between another leg of the primary winding and the auxiliary switch. By selecting the component values appropriately, the main switch can be controlled to achieve zero-voltage switching. The auxiliary switch can be controlled to achieve zero-current ON switching, and zero-voltage OFF switching.

Controlling the ON-OFF time ratios of the switches provides a simple means to improve the circuit power factor. Because the switches operate at low current or low voltage, a reduction in switching noise is achieved.

In alternative embodiments of the invention, the circuit has a single switch connected to the primary winding of a transformer, a capacitor connected across the combination of the primary winding and the switch and a tertiary winding of the transformer is connected in series with a reverse recovery diode to the junction of the capacitor and primary winding. This configuration generates a voltage across the tertiary winding when the switch is ON. The reverse recovery diode becomes reverse biased and interrupts the current through the tertiary winding. This circuit operation can be achieved with fewer components than in the above embodiment. In addition, the reverse recovery diode can be a conventional lowspeed diode which permits a further reduction in manufacturing costs.

In a further embodiment of the invention, a main switch is connected to a primary winding of a transformer which has a secondary output winding, and a tertiary and quaternary winding. A series connection of the quaternary winding, a diode, the tertiary winding and an auxiliary switch are connected across the series connection of the primary winding and main switch. An electrolytic capacitor is connected across the series combination of the tertiary winding and the auxiliary switch.

This embodiment of this circuit can be connected to an AC full-wave rectified power source. Such an application allows current to flow in the circuit even when the sum of the voltage of the AC power supply and the voltage across the quaternary winding is less than the voltage across the electrolytic capacitor. The series circuit consisting of the primary winding and the main switch experiences a current flow in this circumstance, which serves to increase the power supply power factor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 16(*b*) is another top plan view of another power IC of FIG. 15.

DETAILED DESCRIPTION OF THE PREFERRED EMBODIMENT

Figure 1:
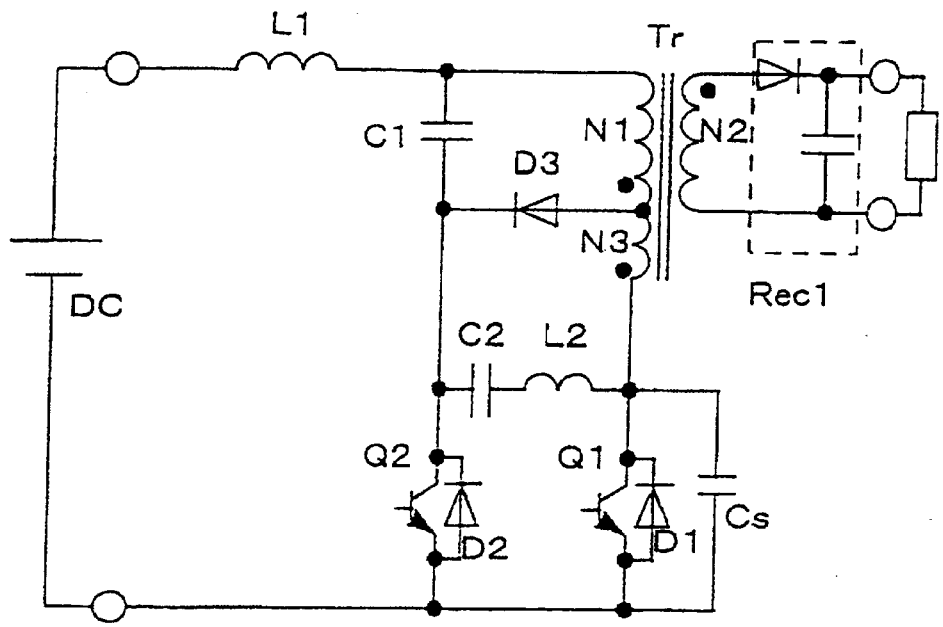
FIG. 1 is a circuit diagram of a switching power supply according to a first embodiment of the invention.

Referring now to FIG. 1, an input reactor L1 is connected to a DC power supply DC. A primary winding N1 and a tertiary winding N3 of a transformer Tr and a main switch Q1 are connected in series to input reactor L1. A diode D1 is connected in parallel across main switch Q1 so that current flows only in an opposite direction to that of main switch Q1. A snubber capacitor Cs is also connected in parallel with the main switch Q1. A series circuit consisting of a resonance capacitor C2, a resonance reactor L2 and an auxiliary switch Q2 is connected in parallel with snubber capacitor Cs. A diode D2 is connected in parallel with auxiliary switch Q2, so that current flows in a direction opposite to the current flow in auxiliary switch Q2. A diode D3 is connected between auxiliary switch Q2 and the connection point of primary winding N1 and tertiary winding N3. A series combination of capacitor C1 and diode D3 is connected in parallel with primary winding N1.

Figure 2:
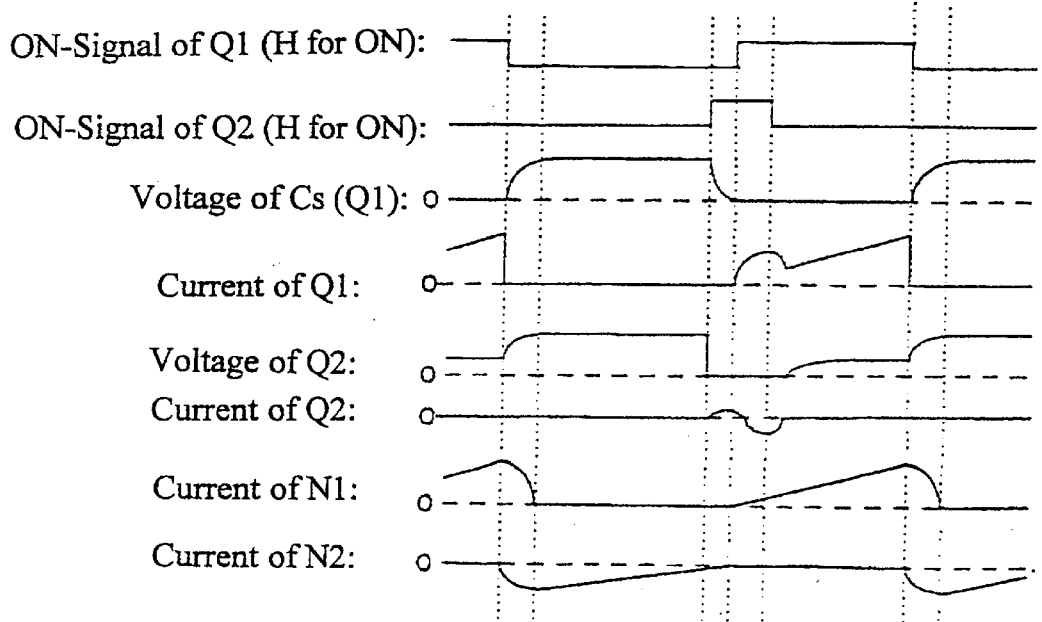
FIG. 2 is a time chart for explaining the operation of the switching power supply of FIG. 1.

Referring now to FIG. 2, auxiliary switch Q2 is switched ON in advance of main switch Q1 being switched ON. When auxiliary switch Q2 is switched ON, the voltage across snubber capacitor Cs decays to zero. Switching auxiliary switch Q2 ON also engages a first resonance series of resonance capacitor C2, resonance reactor L2, and snubber capacitor Cs. A resonance circuit is completed through auxiliary switch Q2. The voltage across auxiliary switch Q2 drops to zero, and the current through auxiliary switch Q2 increases very slowly as the current through snubber capacitor Cs drops to zero. The low current allows auxiliary switch Q2 to execute zero-current switching.

When the voltage across snubber capacitor Cs decays to zero, main switch Q1 is switched ON, thus achieving zero-voltage switching. As main switch Q1 switches ON, a second resonance series of resonance capacitor C2 and resonance reactor L2 is engaged. A resonance circuit is completed by main switch Q1 and diode D2. When current flows through diode D2, the voltage across auxiliary switch Q2 is zero. Auxiliary switch Q2 is then switched OFF and achieves zero-voltage switching.

Since the voltage across snubber capacitor Cs decays to zero when auxiliary switch Q2 is switched ON, main switch Q1 achieves zero-voltage switching when it is switched OFF. When main switch Q1 is switched OFF, the voltage across snubber capacitor Cs rises gradually to a steady value. Furthermore, switching main switch Q1 OFF regenerates the charge in capacitor C1 from the electric charge stored in resonance capacitor C2. Capacitor C1 is further recharged by the energy stored in the leakage inductance of the primary winding N1 via diode D3.

Figure 3:
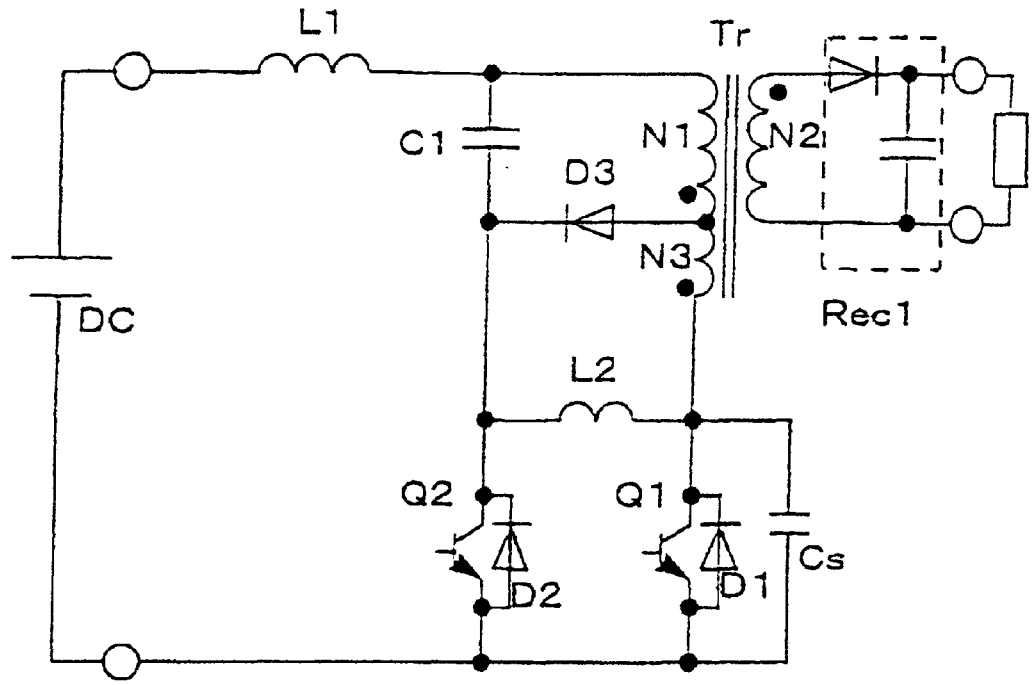
FIG. 3 is a circuit diagram of a switching power supply according to a second embodiment of the invention.

Referring now to FIG. 3, a circuit diagram of a switching power supply according to a second embodiment of the invention is shown. The circuit of FIG. 3 is similar to that of FIG. 1, except for the absence of resonance capacitor C2. Also in FIG. 3, resonance reactor L2 is directly connected to auxiliary switch Q2.

The circuit of FIG. 3 functions similarly to that of the above described circuit of FIG. 1. Auxiliary switch Q2 is switched ON in advance of main switch Q1, forming a resonance circuit with the resonance series of snubber capacitor Cs and resonance reactor L2. When switched ON, auxiliary switch Q2 has very little current flowing through it and is thus able to achieve zero-current switching.

Main switch Q1 achieves zero-voltage switching by being switched ON when the voltage across snubber capacitor is zero. When auxiliary switch Q2 is switched ON, the voltage of snubber capacitor Cs decays to zero. Switching main switch Q1 ON keeps the voltage of snubber capacitor Cs at zero. When main switch Q1 is switched OFF, the voltage across snubber capacitor Cs gradually rises to a steady value. Thus when it is switched OFF, main switch Q1 achieves zero-voltage switching. Furthermore, when main switch Q1 is switched OFF, the energy stored in the leakage inductance of primary winding N1 is regenerated to capacitor C1 via diode D3.

Figure 4:
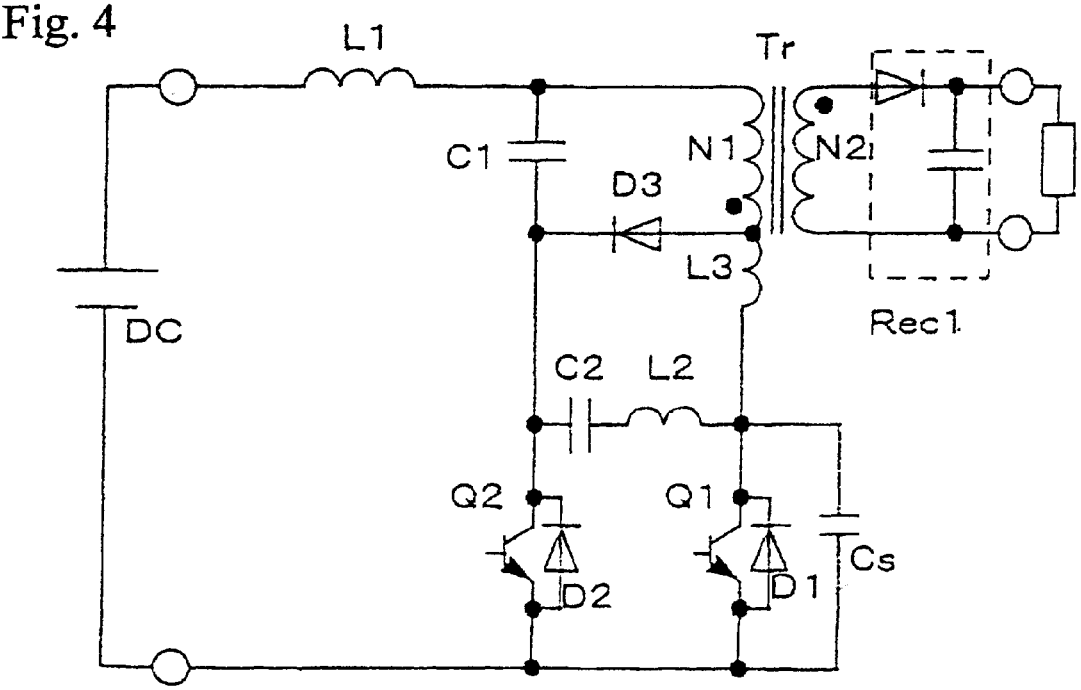
FIG. 4 is a circuit diagram of a switching power supply according to a third embodiment of the invention.

Referring now to FIG. 4, a circuit diagram of a switching power supply according to a third embodiment of the present invention is shown. In this embodiment, tertiary winding N3 of FIG. 1 is replaced with a reactor L3. As with the circuit of FIG. 1, auxiliary switch Q2 is switched ON in advance of main switch Q1. Auxiliary switch Q2 makes a resonance circuit which includes the resonance series of snubber capacitor Cs, resonance capacitor C2 and resonance reactor L2. Very little current flows through the resonance series prior to auxiliary switch Q2 switching ON, which achieves zero-current switching.

The circuit of FIG. 4 otherwise operates in the same manner as that of FIG. 1 and a duplicated explanation is therefore omitted. The replacement of tertiary winding N3 in FIG. 3 with reactor L3 does not otherwise alter the operability of the circuit.

Figure 5:
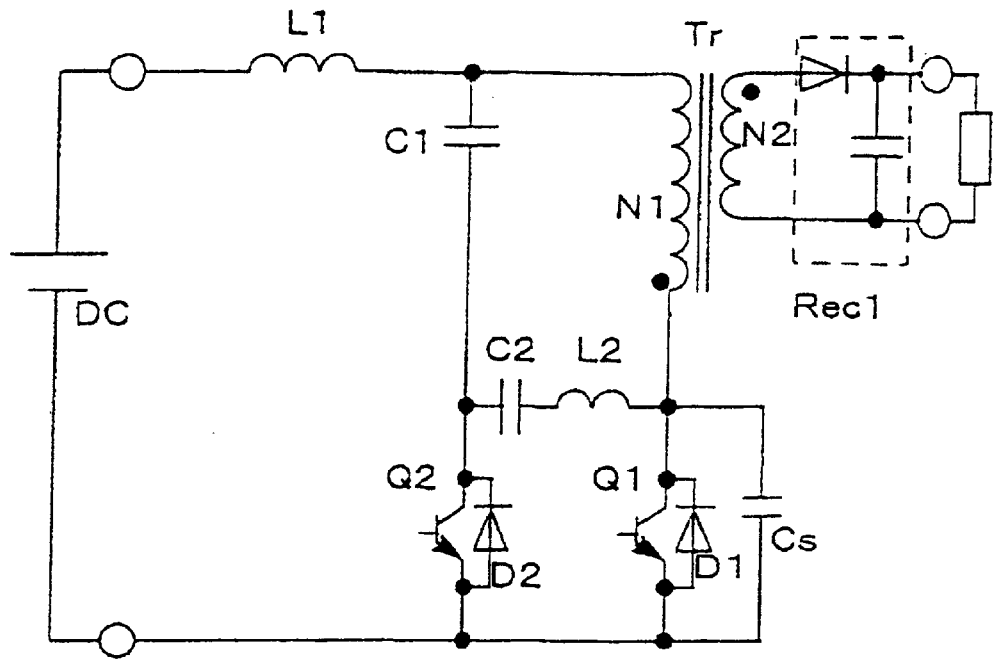
FIG. 5 is a circuit diagram of a switching power supply according to a fourth embodiment of the invention.

Referring now to FIG. 5, a circuit diagram of a switching power supply according to a fourth embodiment of the invention is shown. In this embodiment, diode D3 of FIG. 1 is omitted and tertiary winding N3 is short-circuited to provide primary winding N1 with further windings in transformer Tr. As with the circuit of FIG. 1, auxiliary switch Q2 is switched ON in advance of main switch Q1. When auxiliary switch Q2 is switched ON, the voltage across snubber capacitor Cs decays to zero. Switching auxiliary switch Q2 ON provides a resonance circuit that includes first resonance series of snubber capacitor Cs, resonance capacitor C2 and resonance reactor L2. Very little current flows through the resonance series prior to auxiliary switch Q2 switching ON, which achieves zero-current switching.

When the voltage across snubber capacitor Cs decays to zero, main switch Q1 is switched ON, thus achieving zero-voltage switching. As main switch Q1 switches ON, a second resonance series of resonance capacitor C2 and resonance reactor L2 is engaged. A resonance circuit is completed by main switch Q1 and diode D2. When current flows through diode D2, the voltage across auxiliary switch Q2 is zero. Auxiliary switch Q2 therefore achieves zero-voltage switching upon being switched OFF.

The voltage across snubber capacitor Cs decays to zero when auxiliary switch Q2 is switched ON, and remains zero during the period when main switch Q1 is switched ON. When main switch Q1 is switched OFF, the voltage across snubber capacitor Cs is still zero, thus achieving zero-voltage switching. Once main switch Q1 is switched OFF, the voltage of snubber capacitor Cs rises gradually to a steady value. Furthermore, switching main switch Q1 OFF regenerates the charge in capacitor C1 from the electric charge stored in resonance capacitor C2.

Figure 6:
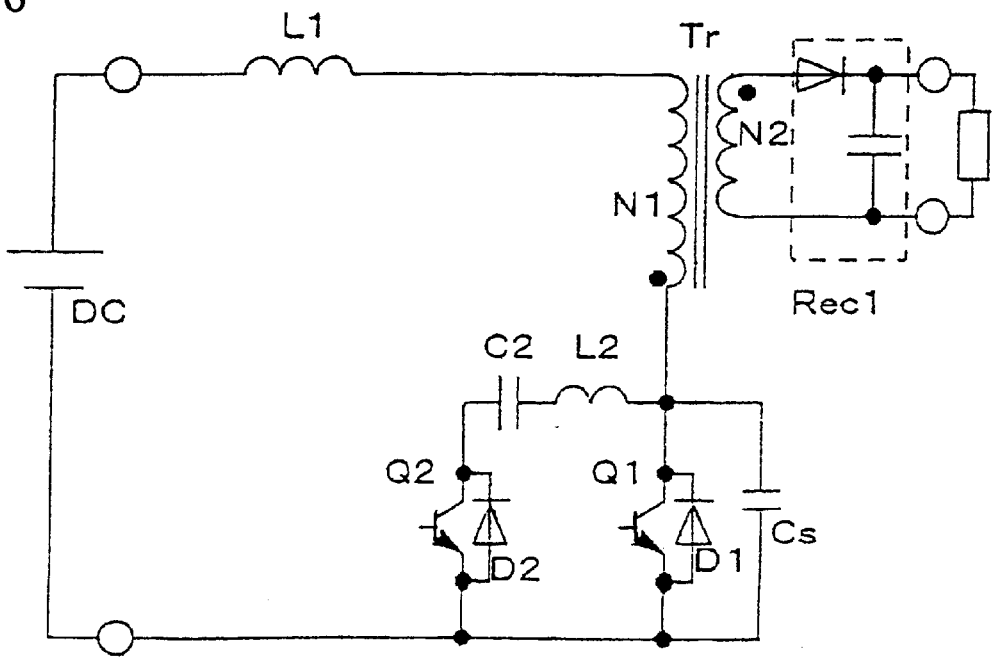
FIG. 6 is a circuit diagram of a switching power supply according to a fifth embodiment of the invention.

Referring now to FIG. 6, a circuit diagram of a switching power supply according to a fifth embodiment of the invention is shown. A DC input is connected in series to a main switch Q1 and a primary winding N1 of a transformer Tr. A diode D1 is connected in parallel across main switch Q1 so that current flows through diode D1 only in a direction opposite to that of main switch Q1. A snubber capacitor Cs is connected in parallel with main switch Q1. A series circuit consisting of a resonance capacitor C2, a resonance reactor L2 and an auxiliary switch Q2 is connected in parallel with the snubber capacitor Cs. A diode D2 is connected in parallel across auxiliary switch Q2 so that current flows only in an opposite direction to that of main switch Q1.

As with the circuit of FIG. 1, auxiliary switch Q2 is switched ON in advance of main switch Q1. When auxiliary switch Q2 is switched ON, the voltage across snubber capacitor Cs decays to zero. Switching auxiliary switch Q2 ON provides a resonance circuit that includes first resonance series of snubber capacitor Cs, resonance capacitor C2 and resonance reactor L2. Very little current flows through the resonance series prior to auxiliary switch Q2 switching ON, which achieves zero-current switching.

When the voltage across snubber capacitor Cs decays to zero, main switch Q1 is switched ON, thus achieving zero-voltage switching. As main switch Q1 switches ON, a second resonance series of resonance capacitor C2 and resonance reactor L2 is engaged. A resonance circuit is completed by main switch Q1 and diode D2. When current flows through diode D2, the voltage across auxiliary switch Q2 is zero. Auxiliary switch Q2 therefore achieves zero-voltage switching upon being switched OFF.

The voltage across snubber capacitor Cs decays to zero when auxiliary switch Q2 is switched ON, and remains zero during the period when main switch Q1 is switched ON. When main switch Q1 is switched OFF, the voltage across snubber capacitor Cs is still zero, thus achieving zero-voltage switching. Once main switch Q1 is switched OFF, the voltage of snubber capacitor Cs rises gradually to a steady value.

Figure 7:
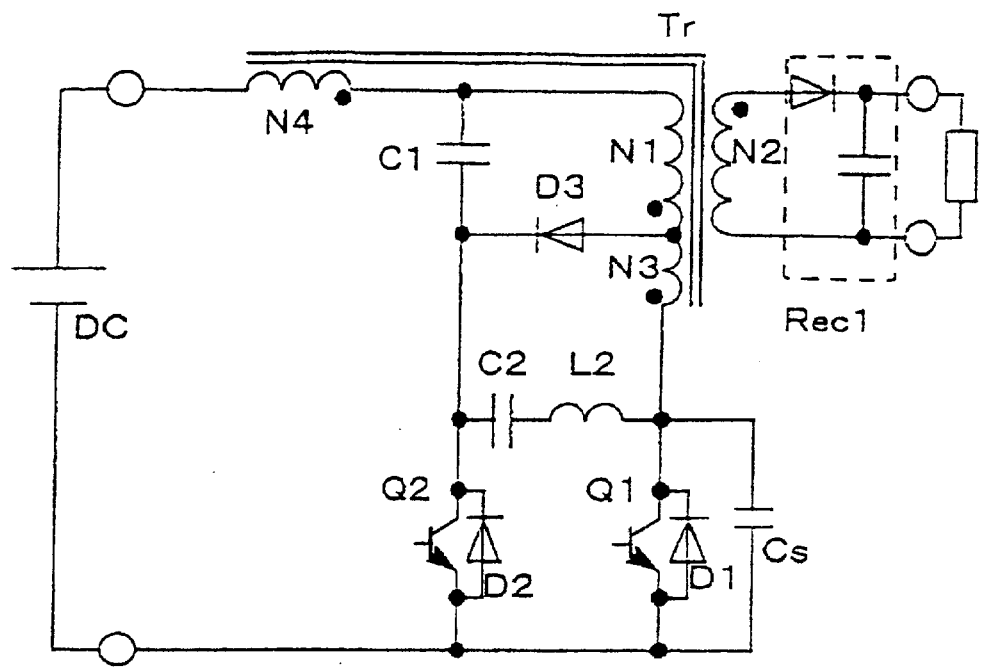
FIG. 7 is a circuit diagram of a switching power supply according to a sixth embodiment of the invention.

Referring now to FIG. 7, a circuit diagram of a switching power supply according to a sixth embodiment of the invention is shown. In this embodiment, input reactor L1 of FIG. 1 is replaced by a quaternary winding N4 of a transformer Tr.

As with the circuit of FIG. 1, auxiliary switch Q2 is switched ON in advance of main switch Q1. When auxiliary switch Q2 is switched ON, the voltage across snubber capacitor Cs decays to zero. Switching auxiliary switch Q2 ON provides a resonance circuit that includes first resonance series of snubber capacitor Cs, resonance capacitor C2 and resonance reactor L2. Very little current flows through the resonance series prior to auxiliary switch Q2 switching ON, which achieves zero-current switching.

The circuit of FIG. 7 otherwise operates in the same manner as that of FIG. 1 and a duplicated explanation is therefore omitted. Moreover, the replacement of input reactor L1 with quaternary winding N4 in FIGS. 3, 4 and 5 does not otherwise alter the operability of the circuit.

The following embodiments focus on providing a switching power supply that exhibits a high power factor.

Figure 8:
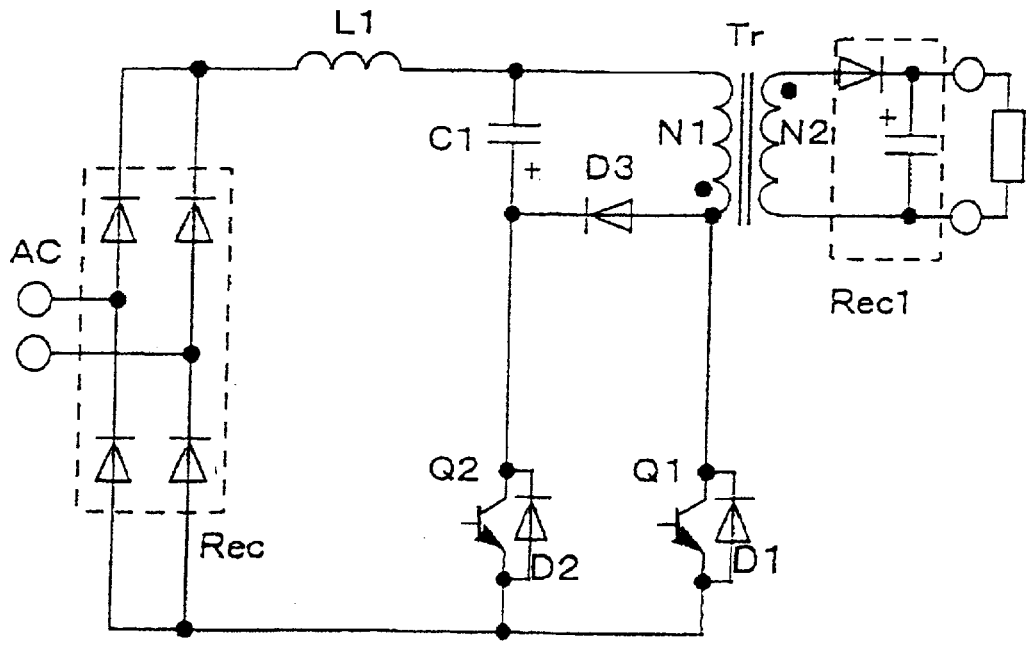
FIG. 8 is a circuit diagram of a switching power supply according to a seventh embodiment of the invention.

Referring now to FIG. 8, a circuit diagram of a switching power supply according to a seventh embodiment of the invention is shown. A pulsed DC input is connected to an input reactor L1. A series circuit consisting of a primary winding N1 of a transformer Tr and a main switch Q1 is connected in series to the input reactor L1. A diode D1 is connected in parallel across main switch Q1 so that current flows through diode D1 only in a direction opposite to that of main switch Q1. A series circuit consisting of a capacitor C1 and an auxiliary switch Q2 is connected in parallel with the series circuit of primary winding N1 and main switch Q1. A diode D2 is connected in parallel across auxiliary switch Q2 so that current flows through diode D2 only in a direction opposite to that of auxiliary switch Q1. A diode D3 is connected between auxiliary switch Q2 and the connection point of primary winding N1 and main switch Q1.

The switching power supply operates by first switching ON main switch Q1 to provide an input current flow. Switching main switch Q1 ON improves the power factor of the power supply because input current flows even with low input voltage. When main switch Q1 is switched OFF, a portion of the excitation energy within transformer Tr is stored in capacitor C1 which is connected in parallel with primary winding N1 of transformer Tr through diode D3.

Auxiliary switch Q2 is then switched ON, causing the energy stored in capacitor C1 to be transferred to input reactor L1 through a rectifier Rec. Switching auxiliary switch Q2 OFF then causes the energy stored in input reactor L1 to be transferred to the transformer Tr. The result is that the energy stored in capacitor C1 is fed to the load.

Figure 9:
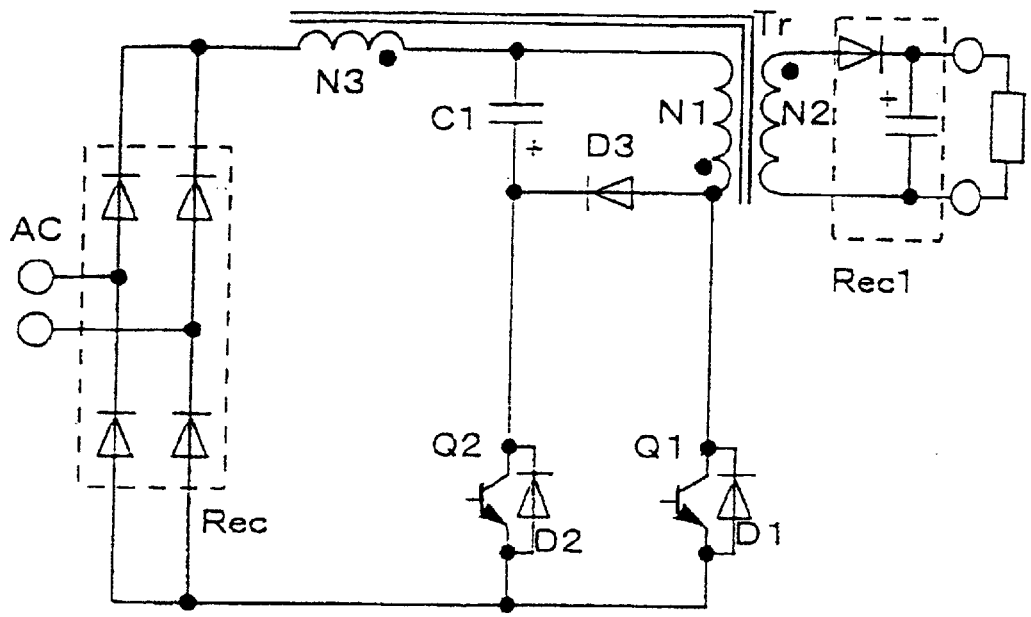
FIG. 9 is a circuit diagram of a switching power supply according to an eighth embodiment of the invention.

Referring now to FIG. 9, a circuit diagram of a switching power supply according to an eighth embodiment of the present invention is shown. This embodiment is substantially the same as that of FIG. 8, except that input reactor L1 in FIG. 8 is replaced with a tertiary winding N3 of transformer Tr. The operation of the switching power supply of FIG. 9 is substantially the same as that of the switching power supply of FIG. 8 and an explanation will therefore be omitted for the sake of simplicity.

Figure 10:
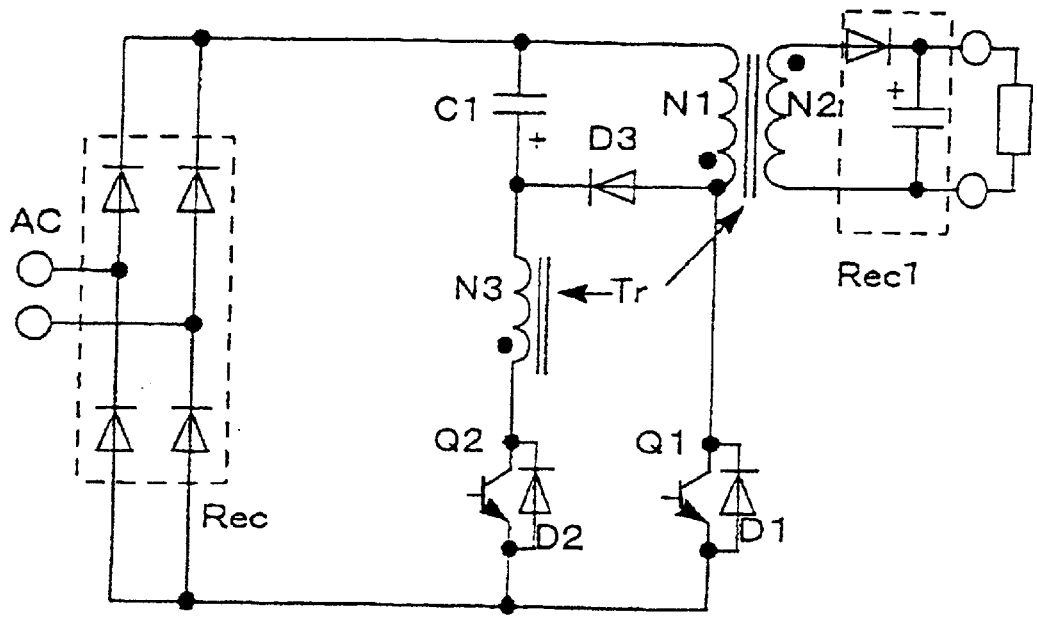
FIG. 10 is a circuit diagram of a switching power supply according to a ninth embodiment of the invention.

Referring now to FIG. 10, a circuit diagram of a switching power supply according to a ninth embodiment of the present invention is shown. This embodiment is substantially the same as that of FIG. 8, except that input reactor L1 in FIG. 8 is omitted. A tertiary winding N3 of a transformer Tr is connected between a capacitor C1 and an auxiliary switch Q2. The operation of the circuit is otherwise substantially the same as that of the switching power supply of FIG. 8 and an explanation will therefore be omitted for the sake of brevity.

The embodiments of the present invention presented to this point represent switching power supplies with fly-back-type power converters. As explained below, the present invention is also applicable to switching power supplies with fly-forward-type power converters.

Figure 11:
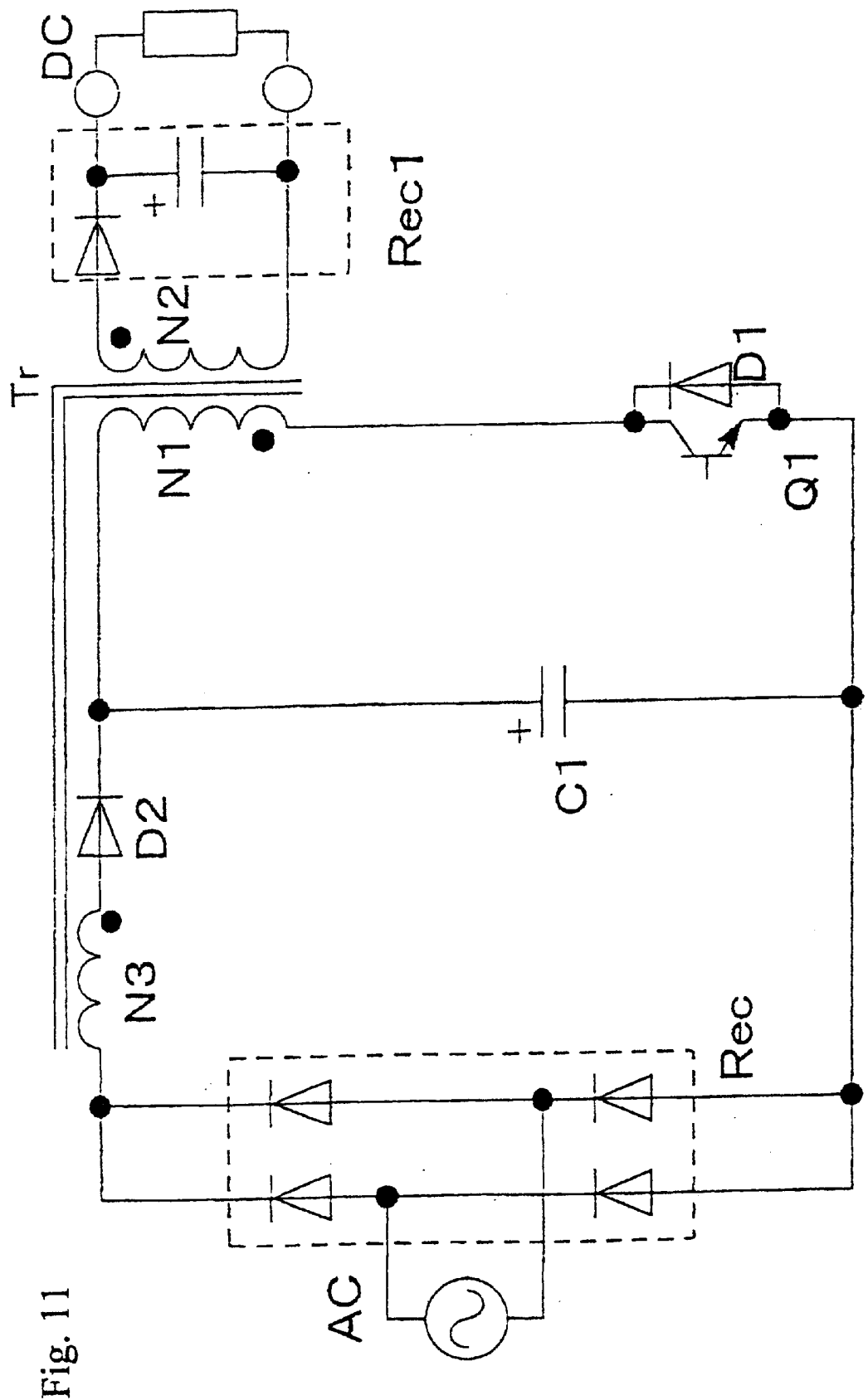
FIG. 11 is a circuit diagram of a switching power supply according to a tenth embodiment of the invention.

Referring now to FIG. 11, a circuit diagram of a switching power supply according to a tenth embodiment of the present invention is shown. In this embodiment, a high-speed reverse-recovery diode D2 is connected in series between a tertiary winding N3 and a primary winding N1 of a transformer Tr. Tertiary winding N3 is connected in series to a rectifier Rec that rectifies an input AC voltage to a pulsed DC voltage. An electrolytic capacitor C1 is connected between primary winding N1 and the common connection of rectifier Rec. A semiconductor switch Q1 is connected in series with primary winding N1. A diode D1 is connected in parallel with semiconductor switch Q1 so that current flows through diode D1 only in a direction opposite to that of semiconductor switch Q1.

The circuit of FIG. 11 operates by first switching ON semiconductor switch Q1. When semiconductor switch Q1 is switched ON, a voltage is generated across tertiary winding N3 in opposite polarity to diode D2. The opposite polarity voltage causes diode D2 to be reversed biased. Since the reverse recovery of diode D2 occurs at high speed, the current is quickly interrupted and no current flows through rectifier Rec. The characteristic of high speed current interruption provided by diode D2 makes it unnecessary to specify that rectifier Rec have high-speed reverse-recovery performance. Rectifier Rec can then be constructed from conventional low-speed diodes, thus significantly reducing the manufacturing costs associated with the switching power supply.

Figure 12:
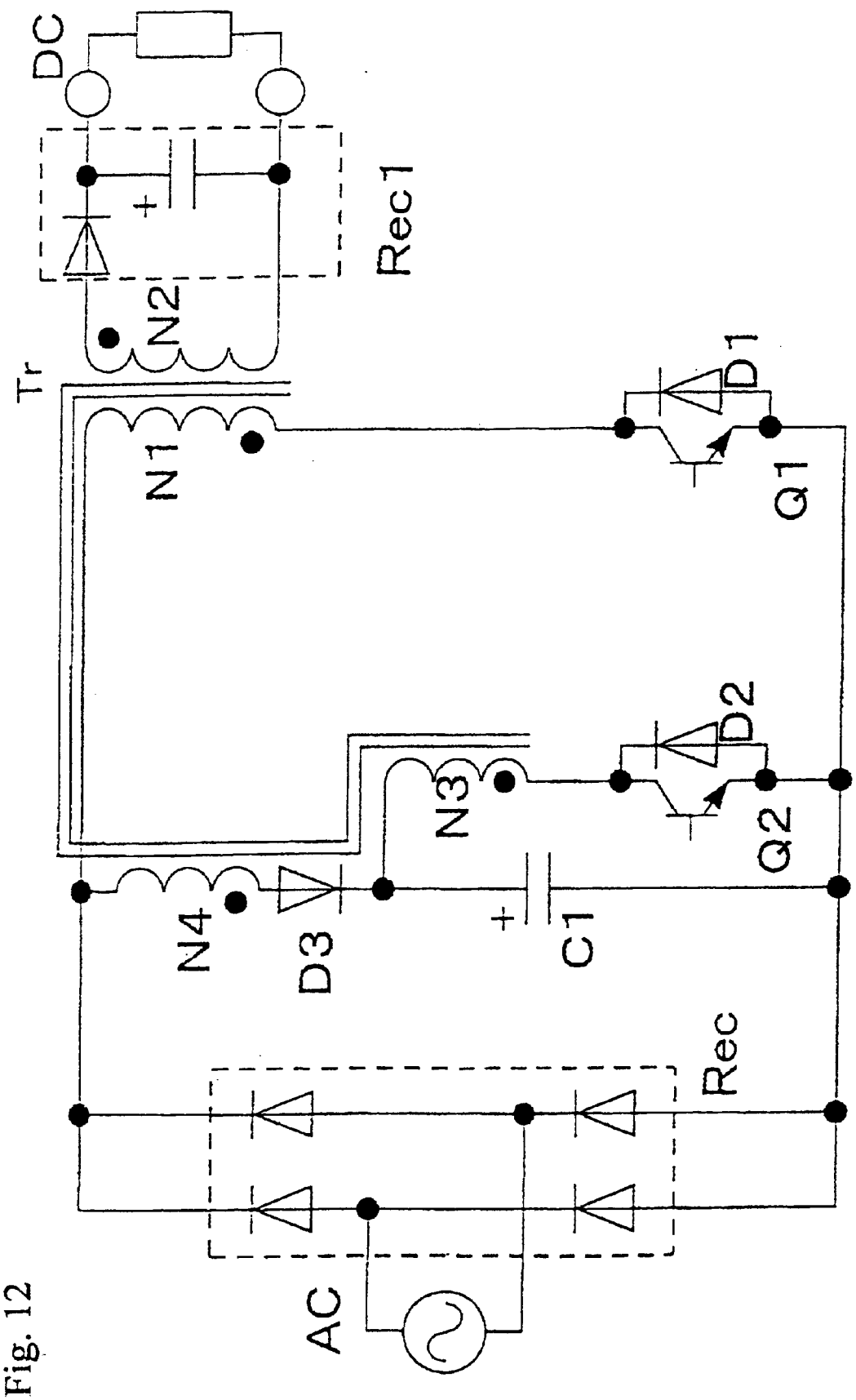
FIG. 12 is a circuit diagram of a switching power supply according to an eleventh embodiment of the invention.

Referring now to FIG. 12, a circuit diagram of a switching power supply according to an eleventh embodiment of the present invention is shown. In this embodiment, a semiconductor switch Q1 is connected in series to a primary winding N1 of a transformer Tr. A diode D1 is connected in parallel across semiconductor switch Q1 so that current flows through diode D1 only in a direction opposite to that of semiconductor switch Q1. A series circuit consisting of a quaternary winding N4 of transformer Tr, a diode D3 and an electrolytic capacitor C1 is connected between primary winding N1 and a common connection of rectifier Rec. A series circuit consisting of a tertiary winding N3 of the transformer Tr and a semiconductor switch Q2 is connected in parallel with the electrolytic capacitor C1. A diode D2 is connected in parallel across second semiconductor switch Q2 so that current flows through diode D2 only in a direction opposite to that of semiconductor switch Q2.

Semiconductor switch Q1 provides a portion of the control of the operation of the switching power supply. When semiconductor switch Q1 is switched ON, energy is stored in primary winding N1 of transformer Tr. As energy is stored in primary winding N1, a voltage is generated across quaternary winding N4 of transformer Tr. The voltage across quaternary winding N4 has a polarity that is positive towards the connection to rectifier Rec and negative towards the connection to electrolytic capacitor C1. This voltage across quaternary winding N4 prevents electrolytic capacitor C1 from being charged up.

Switching semiconductor switch Q1 OFF causes the energy stored in primary winding N1 to be transferred to secondary winding N2 and quaternary winding N4 of transformer Tr. Energy transferred to secondary winding N2 is fed to the load through a rectifier Rec 1. As energy is transferred from primary winding N1, a voltage is generated across quaternary winding N4. The polarity of the voltage across quaternary winding N4 is negative towards the connection to rectifier Rec and positive towards the connection to electrolytic capacitor C1. This voltage across quaternary winding N4 feeds energy through diode D3 to charge electrolytic capacitor C1.

Semiconductor switch Q2 provides another portion of the control of the operation of the switching power supply. When semiconductor switch Q2 is switched ON, electrolytic capacitor C1 is discharged through tertiary winding N3. The discharging current stores energy tertiary winding N3 of transformer Tr. As energy is stored in tertiary winding N3, a voltage is generated across quaternary winding N4 of the transformer Tr. The polarity of the voltage across quaternary winding N4 is positive towards the connection to rectifier Rec and negative towards the connection to electrolytic capacitor C1. This voltage across quaternary winding N4 prevents electrolytic capacitor C1 from being charged.

Switching semiconductor switch Q2 OFF causes the energy stored in tertiary winding N3 to be transferred to secondary winding N2 and quaternary winding N4 of transformer Tr. The energy transferred to secondary winding N2 is fed to the load through rectifier Rec1. As energy is transferred from tertiary winding N3, a voltage is generated across quaternary winding N4. The polarity of the voltage across quaternary winding N4 is negative towards the connection to rectifier Rec and positive towards the connection to electrolytic capacitor C1. This voltage across quaternary winding N4 feeds energy through diode D3 to charge electrolytic capacitor C1.

In the above described circuit operation, quaternary winding N4 discharges either by switching semiconductor switch Q1 or semiconductor switch Q2. An input current therefore flows through the path connecting quaternary winding N4, diode D3, electrolytic capacitor C1, rectifier Rec and alternating power supply AC, even when the input voltage is lower than that of electrolytic capacitor C1. The uninterrupted current flow widens the conduction angle and improves the power factor.

The operation of the above described circuit provides a voltage sum applied to capacitor C1. The voltage across quaternary winding N4 and the input voltage combine during specific intervals to apply a charge voltage to capacitor C1. This voltage charges capacitor C1 to a value that is greater than the peak value of the input voltage.

The voltage of power supply AC drops during specific intervals to the point where the sum of the voltage of power supply AC and quaternary winding N4 is less than the voltage of the electrolytic capacitor C1. When the combined voltage of power supply AC and quaternary winding N4 reaches falls to this point, electrolytic capacitor C1 is not charged. During the interval when electrolytic capacitor C1 is not charged, a current still flows through the series circuit consisting of primary winding N1 and semiconductor switch Q1. The current flows through rectifier Rec and widens the conduction angle, thus improving the power factor of the circuit.

In the above described circuit operation, semiconductor switch Q1 and semiconductor switch Q2 have been described as operating independent of each other. It should be recognized that the circuit also operates properly when semiconductor switches Q1, Q2 are switched simultaneously or in sequence.

Figure 19:
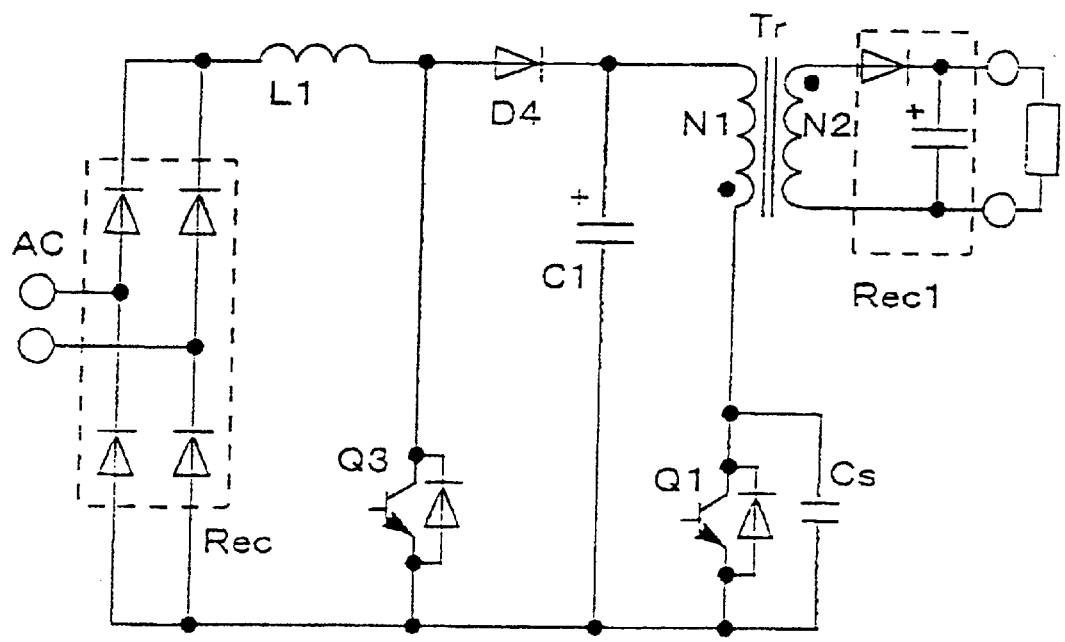
FIG. 19 is a circuit diagram of a conventional fly-back-type switching power supply.

Television sets and other similar portable devices generally have a so-called waiting mode when operating normally. In this waiting mode the load on the power supply from the device is about $1/100$ as great as the rated load of the device. Under this type of light-load condition the conversion efficiency of the power supply is greatly diminished. This loss of efficiency is particularly notable when the electric power to the device is regulated by a conventional switching power supply as shown in FIG. 19.

The loss of efficiency is related to the switches being driven for the rated load, which produces electric power much too great for the light load. Moreover, the transformer is energized with a rectangular wave that is shaped to deliver power for the rated load. The shape of the energizing wave produces a high peak current in a short interval. Thus, when the load on the transformer lightens, energy within the transformer is dispersed through high copper losses.

Furthermore, the loss of efficiency due to high driving power and copper losses results in the battery of the portable device being rapidly consumed. The operational life of the portable device is therefore shortened. The shortened operating life presents further difficulties in meeting power consumption regulations.

Figure 13:
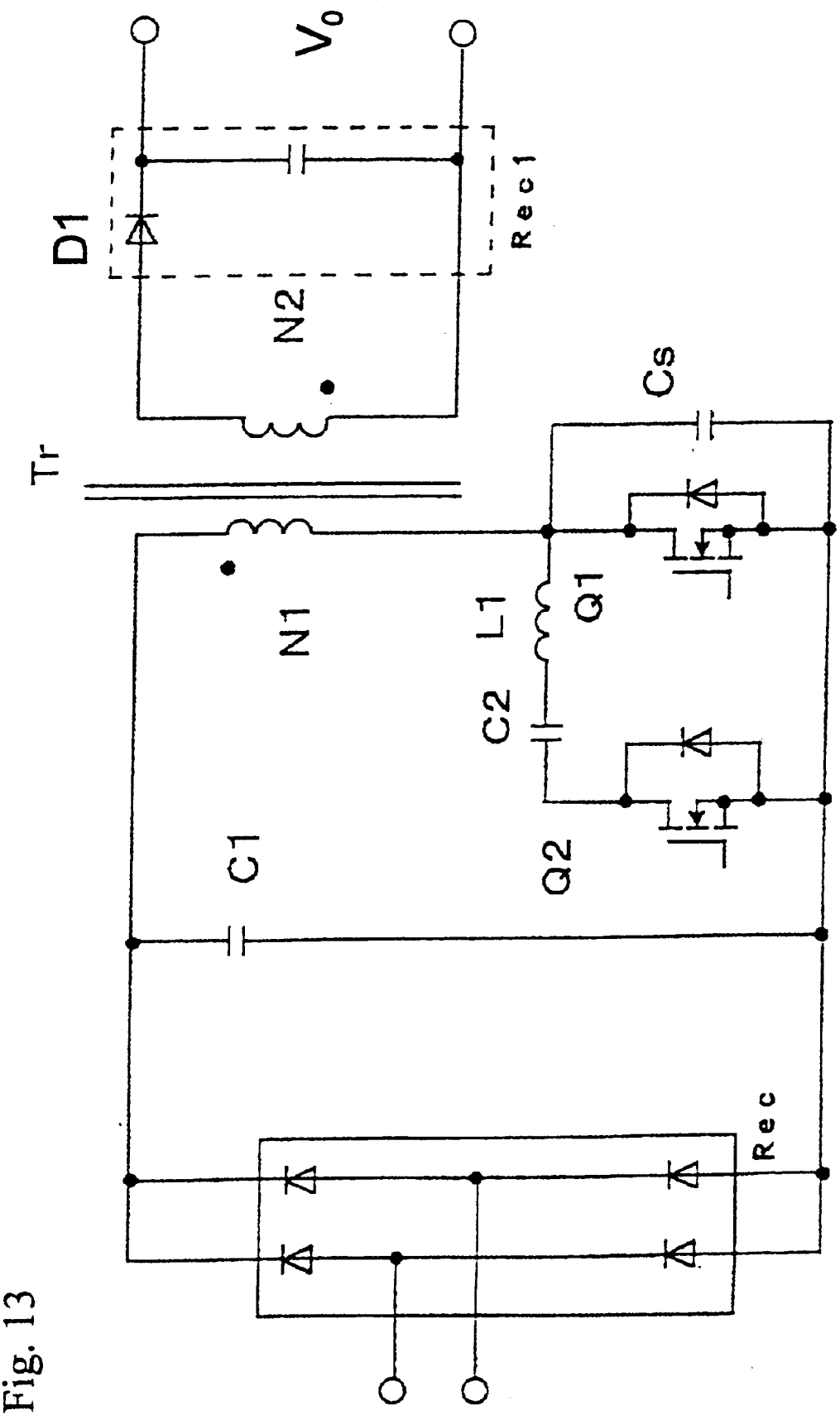
FIG. 13 is a circuit diagram of a switching power supply according to a twelfth embodiment of the invention.

Referring now to FIG. 13, a circuit diagram of a switching power supply according to a twelfth embodiment of the present invention is shown that facilitates obviating the foregoing problems. In this embodiment, a series circuit consisting of a resonance reactor L1, a resonance capacitor C2 and an auxiliary switch Q2 is connected in parallel with a main switch Q1. Auxiliary switch Q2 is rated at a value which is about $1/10$ as high as that of main switch Q1.

The switching power supply of FIG. 13 operates by storing energy in a transformer Tr when main switch Q1 is switched ON. A snubber capacitor Cs connected in parallel with main switch Q1 is charged when the circuit operates and auxiliary switch Q2 is switched OFF. Auxiliary switch Q2 is switched ON in advance of main switch Q1 being switched ON. Switching auxiliary switch Q2 ON causes the electric charge in snubber capacitor Cs to be discharged through resonance capacitor C2 and resonance reactor L1. Once the voltage of snubber capacitor Cs has fallen to zero, main switch Q1 is switched ON. Switching main switch Q1 ON while snubber capacitor Cs is discharged achieves zero-voltage switching with main switch Q1.

When the power supply is operating under light-load conditions such as, for example, in waiting mode, auxiliary switch Q2 is switched ON while main switch Q1 is switched OFF. When only auxiliary switch Q2 is switched ON, a current flows through the series circuit consisting of primary winding N1, resonance capacitor C2 and resonance reactor L1. Due to the presence of resonance capacitor C2, the load is driven only with current flowing through the resonance series circuit and auxiliary switch Q2. When this current drives the load, the voltage of primary winding N1 decreases as the voltage of resonance capacitor C2 increases. When the voltage of resonance capacitor C2 exceeds the input voltage, the voltage of primary winding N1 reverses polarity and current flows in through primary winding N1 in an opposite direction. The current through primary winding N1 supplies a voltage across secondary winding N2. The voltage across secondary winding N2 increases until it exceeds an output voltage Vo. When the voltage of secondary winding N2 exceeds output voltage Vo, a diode D1 becomes forward biased and transfers the energy stored in secondary winding N2 to the load.

When a rated load is driven, main switch Q1 is ON and the input voltage is applied directly to primary winding N1 of transformer Tr. The current that flows through primary winding N1 in this instance has a triangular wave form.

When a light load is driven, only auxiliary switch Q2 is switched ON. The current in this instance is suppressed to a value determined by the impedance of resonance capacitor C2, resonance reactor L1 and the excitation inductance of transformer Tr. In this configuration, resonance capacitor C2 is selected to have a capacitance corresponding to the rating of the light load. The smaller capacitance of resonance capacitor C2 reduces the current through transformer Tr, so that the peak value of the current is less than the peak value of the triangular wave form of the rated current. A lower peak value for the current reduces losses in transformer Tr and conduction losses in switches Q1, Q2. Since the rating of auxiliary switch Q2 is approximately 1/10 of that of main switch Q1, the electric power that drives the light load is suppressed to approximately 1/10 of the electric power that drives the rated load.

Figure 14:
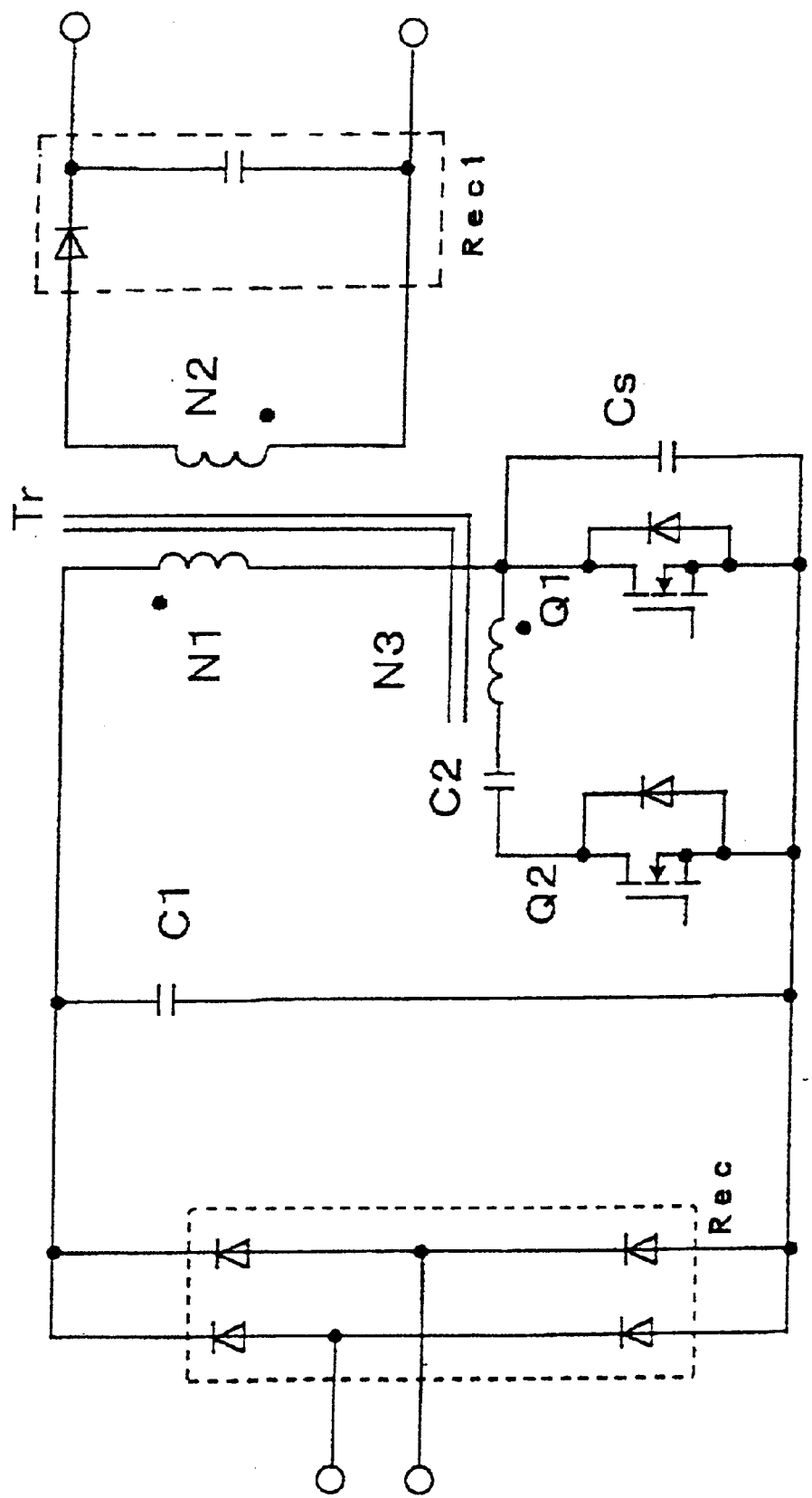
FIG. 14 is a circuit diagram of a switching power supply according to a thirteenth embodiment of the invention.

Referring now to FIG. 14, a circuit diagram of a switching power supply according to a thirteenth embodiment of the present invention is shown. In this embodiment, resonance reactor L1 of FIG. 13 is replaced by a tertiary winding N3 of a transformer Tr.

The circuit of FIG. 14 operates in substantially the same manner as the circuit of FIG. 13. The main difference is that switching auxiliary switch Q2 ON connects primary winding N1 in series with tertiary winding N3. The excitation inductance of tertiary winding N3 is proportional to the square of the number of turns of the winding. The excitation inductance of tertiary winding N3 is made very large by adding only a few turns to primary winding N1 of transformer Tr. The high excitation inductance of tertiary winding N3 achieves a lower peak value for the current through transformer Tr. In addition, resonance reactor L1 is a constituent element of the circuit in FIG. 13. Replacing resonance reactor L1 with tertiary winding N3 reduces the number of constituent elements, while still providing the capability of efficiently driving a light load.

Although the switching power supply of FIGS. 13 or 14 are described driving the rated load and the light load (in the waiting mode of operation) with the same circuit, two separate circuits are usually used to drive the rated load and the light load, respectively.

Figure 15:
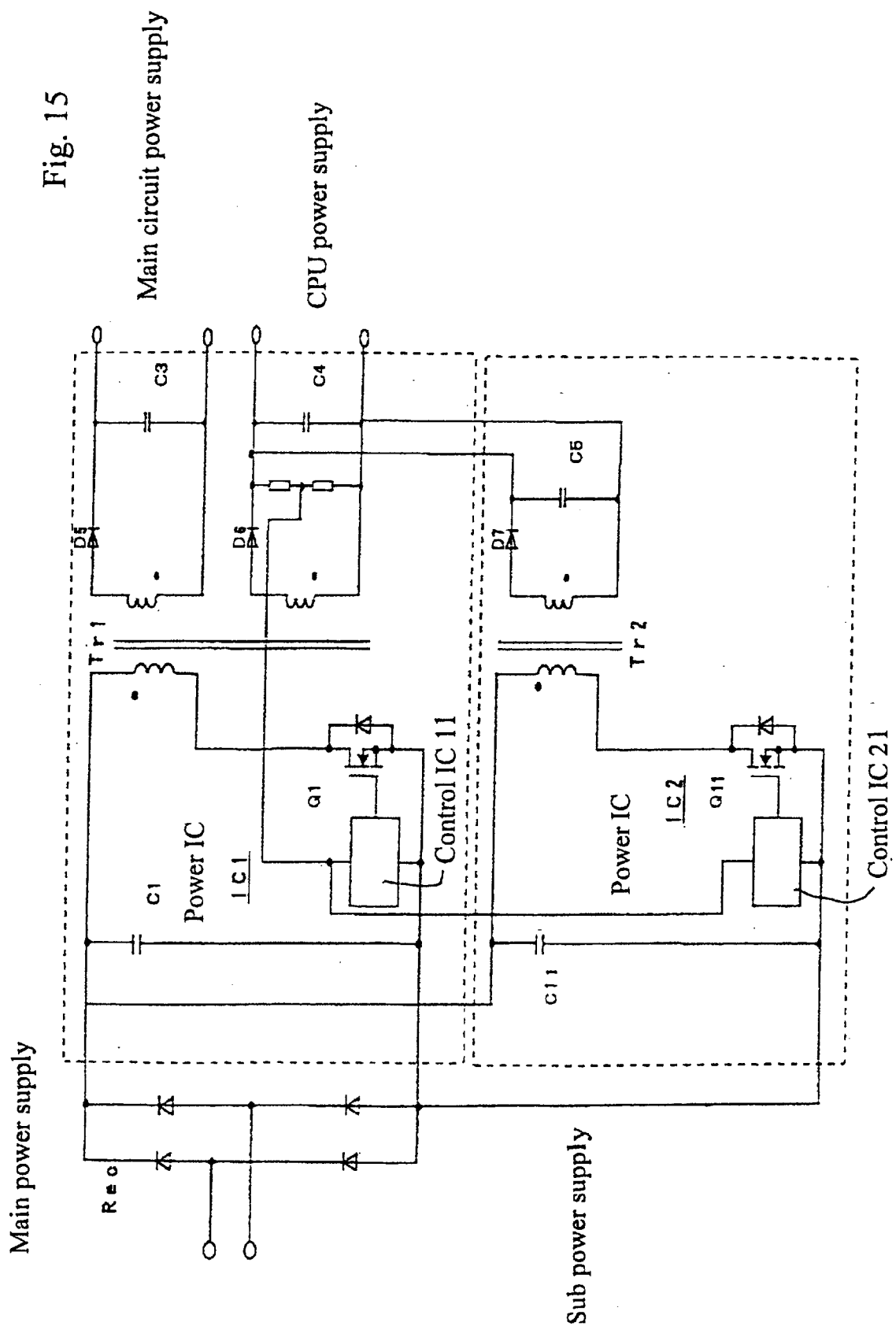
FIG. 15 is a circuit diagram of a general switching power supply for driving a light load as well as for driving a rated load.

Referring now to FIG. 15, a circuit diagram of a general switching power supply for driving a light load and a rated load is shown. In this embodiment, the switching power supply includes a main power supply and a sub power supply. The main power supply includes capacitors C1, C3 and C4, a transformer Tr1, a power integrated circuit ("power IC") IC1 and diodes D5, D6. The sub power supply includes capacitors C5, C 11, a transformer Tr2, a power IC IC2 and a diode D7. Power IC IC1 includes a MOSFET Q1 and a control integrated circuit ("control IC") IC11. Power IC IC2 includes a MOSFET Q11 and a control IC IC21.

When a load (not shown) is driven, DC power is fed to a main circuit power supply that includes diode D5 and capacitor C3, and to a CPU power supply that includes diode D6 and capacitor C4. The DC power is generated by switching MOSFET Q1 ON and OFF such that an AC voltage is applied to transformer Tr1. Control IC IC11 adjusts the main circuit power supply to a specific value by detecting and comparing the output voltage with a reference voltage. The results of the comparison are used to regulate the ON-OFF time ratio of MOSFET Q1.

When driving a light load in the waiting mode of operation, MOSFET Q11 is switched ON and OFF and MOSFET Q1 is not driven. Switching MOSFET Q11 ON and OFF applies an AC voltage to transformer Tr2 which in turn supplies DC power to only the CPU power supply. In this configuration, DC power provided through diode D7 and capacitor C5 is fed only to the CPU power supply. Control IC IC21 adjusts the CPU power supply to a specific value by detecting and comparing the output voltage with a reference voltage. The results of the comparison are used to regulate the ON-OFF time ratio of MOSFET Q11. In this configuration the consumed power is reduced to several watts which provides compliance with various energy regulations.

Figure 16A:
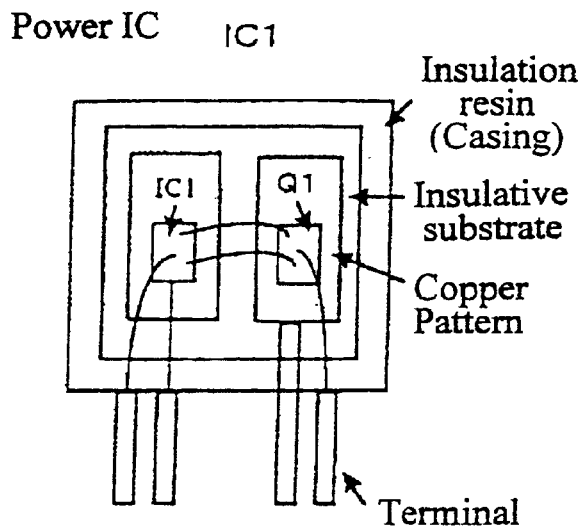
FIG. 16(*a*) is a top plan view of a power IC of FIG. 15.
Figure 16B:
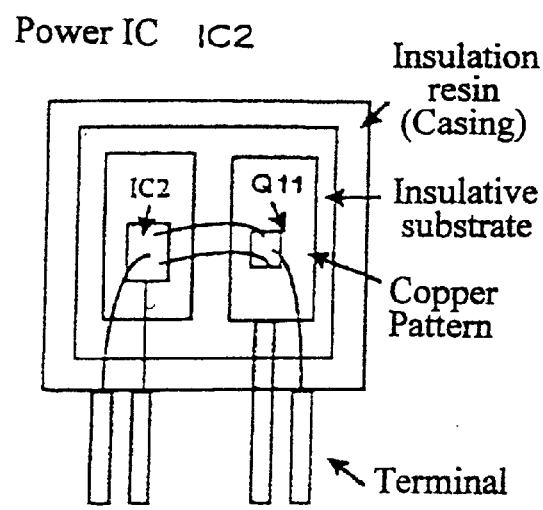

Referring now to FIGS. 16(a)–(b), top plan views of power IC IC1 and IC2 are shown. Each power IC package includes a chip that has an insulative substrate on which a copper pattern is formed. The chip must be electrically isolated from a terminal and from a casing to function properly. This requirement increases the size of the respective power ICs and also adds to their cost.

Figure 17:
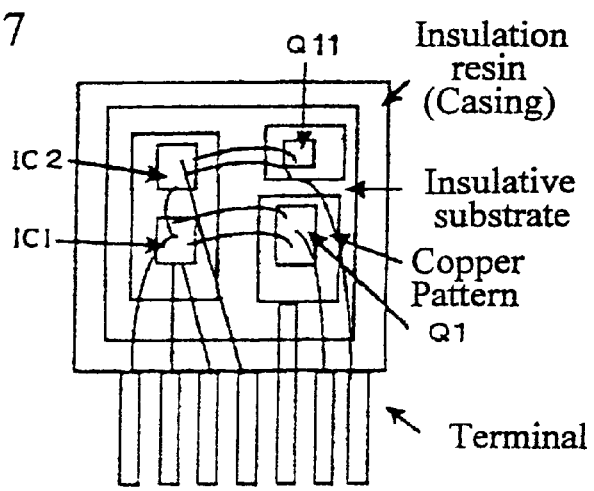
FIG. 17 is a top plan view of a power IC package according to the invention.

Referring now to FIG. 17, a top plan view of a power IC package according to an embodiment of the present invention is shown. This embodiment obviates the above described problems inherent in the individual power IC packages.

The IC package according to the present invention mounts the structure of power ICs IC1 and IC2 on a common insulative substrate. The common mounting reduces the total area needed to realize the power IC and thus reduces the total cost of the power ICs IC1 and IC2.

Figure 18:
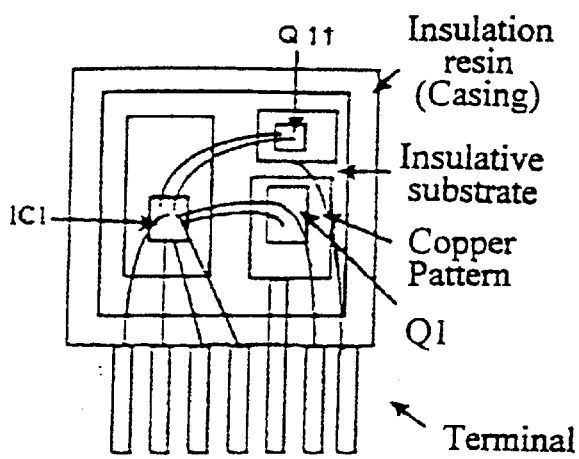
FIG. 18 is another top plan view of another power IC package according to the invention.

Referring now to FIG. 18, a top plan view of another power IC package according to an embodiment of the present invention is shown. In this embodiment, the functions of the control ICs IC1 and IC2 are integrated into a single control IC. This integration is possible because control ICs IC1 and IC2 have almost the same structure and function.

Integration of various switching power supply devices is not limited to that described in connection with the general switching power supply illustrated in FIG. 15. The various switching power supplies shown and described in FIGS. 1 through 14 may also be integrated and achieve equivalent efficiencies in cost and size. When any of the various switching power supplies described in FIGS. 1 through 15 must handle a light load associated with the waiting mode of operation, control ICs may be used in place of main and auxiliary switches. Alternatively, a control IC may be used that has common main and auxiliary switches disposed thereon.

The following are some examples of the advantages of the various embodiments of the present invention.

Since zero-voltage switching and zero-current switching are obtained, the switching loss is reduced.

Since dv/dt during switching is small, noise is reduced.

The switching power supply according to the invention is adaptable to TV sets and display devices that synchronize the switching frequency with the deflection frequency.

The power factor is improved and noise is reduced. Moreover, the output voltage is easily compensated, since the energy stored in the primary side capacitor is fed to the load at instantaneous service interruption.

The manufacturing costs of the switching power supply are reduced, since a high-speed reverse-recovery diode is used on the primary side of the transformer and, therefore, general low-speed diodes are satisfactorily employable to the rectifier.

The power factor is improved, since the input current is made flow as far as the switching power supply is operating. And, the output voltage is compensated easily at instantaneous service interruption, since it is possible for the voltage of the electrolytic capacitor to exceed the peak value of the input voltage.

The switching power supply may be used for a longer period of time, since the driving electric power in the waiting mode is small due to the small rated values of the auxiliary switch and, therefore, the power consumption is reduced. Therefore, it is possible to meet the power consumption regulations for the TV sets and such instruments.

It is not necessary to install any additional switching power supply, the rated values thereof are 1/100 as large as those of the main switching power supply. Therefore, a small, light-weight and low cost switching power supply is obtained.

The number of the packaging parts such as an insulative substrate is reduced, the dimensions of the package are minimized and the costs of the switching power supply are reduced, since the switch for the main power supply, the control IC for controlling the switch for the main power supply, the switch for the sub power supply and the control IC for controlling the switch for the sub power supply are installed on a common package. Moreover, the common control IC that controls the switches for the main power supply and the sub power supply facilitates further downsizing and cost reduction.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A switching power supply adapted for use with an input DC power supply comprising:

an input reactor;

a transformer having at least a primary winding and a secondary winding;

said primary winding of said transformer connected to said DC power supply through said input reactor;

a rectifying and smoothing circuit connected to said secondary winding of said transformer;

a main semiconductor switch connected in series with said primary winding;

a first diode connected in opposite parallel with said main semiconductor switch;

a snubber capacitor connected in parallel with said main semiconductor switch;

a series circuit including a resonance component and an auxiliary semiconductor switch connected in parallel with said main semiconductor switch;

said series circuit being effective to discharge an electric charge of said snubber capacitor; and a second diode connected in opposite parallel with said auxiliary semiconductor switch.

2. A switching power supply according to claim 1, further including a capacitor interposed between said input reactor and said auxiliary semiconductor switch.

3. A switching power supply according to claim 1, wherein said resonance component includes a resonance capacitor and a resonance reactor connected in series.

4. A switching power supply according to claim 2, wherein said resonance component includes a resonance capacitor and a resonance reactor connected in series.

5. A switching power supply according to claim 2, further including:

a tertiary winding interposed between said primary winding of said transformer and said main semiconductor switch; and a third diode interposed between said primary winding and said auxiliary semiconductor switch effective to connect said capacitor in parallel with said primary winding.

6. A switching power supply according to claim 5, wherein said resonance component includes a resonance capacitor and a resonance reactor in series.

7. A switching power supply according to claim 5, wherein said resonance component includes a resonance reactor.

8. A switching power supply according to claim 4, further including:

a reactor interposed between said primary winding of said transformer and said main semiconductor switch; and a third diode interposed between said primary winding and said auxiliary semiconductor switch effective to connect said capacitor in parallel with said primary winding.

9. A switching power supply according to claim 1, wherein:

said transformer further includes an auxiliary winding; and said auxiliary winding replaces said input reactor.

10. A switching power supply according to claim 2, wherein:

said transformer further includes an auxiliary winding; and said auxiliary winding replaces said input reactor.

11. A switching power supply according to claim 5, wherein:

said transformer further includes an auxiliary winding; and said auxiliary winding replaces said input reactor.

12. A switching power supply according to claim 8, wherein:

said transformer further includes an auxiliary winding; and said auxiliary winding replaces said input reactor.

13. A switching power supply adapted for use with an input DC power supply comprising:

an input reactor;

a transformer having at least a primary winding and a secondary winding;

said primary winding of said transformer connected to said DC power supply through said input reactor;

a rectifying and smoothing circuit connected to said secondary winding of said transformer;

a main semiconductor switch connected in series with said primary winding;

a first diode connected in opposite parallel with said main semiconductor switch;

a series circuit including a capacitor and an auxiliary semiconductor switch, said series circuit connected in parallel with said primary winding and said main semiconductor switch;

a second diode connected in opposite parallel with said auxiliary semiconductor switch; and a third diode interposed between said primary winding and said auxiliary semiconductor switch.

14. A switching power supply according to claim 13, wherein:

said transformer further includes a tertiary winding; and said tertiary winding replaces said input reactor.

15. A switching power supply according to claim 13, wherein:

said transformer further includes a tertiary winding;

said tertiary winding replaces said input reactor; and said tertiary winding interposed between said capacitor and said auxiliary switch of said series circuit.

16. A switching power supply adapted for use with an input DC power supply comprising:

a transformer having at least a primary winding and a secondary winding;

a main semiconductor switch connected in series with said primary winding;

said primary winding connected to said DC power supply;

a smoothing and rectifying circuit connected to said secondary winding;

said smoothing and rectifying circuit being effective to deliver DC electric power to a load;

a series circuit including a resonance capacitor, a resonance reactor and an auxiliary semiconductor switch;

said series circuit connected in parallel with said main semiconductor switch;

said main semiconductor switch being switched OFF when said switching power supply drives a light load substantially smaller than a rated load; and said auxiliary semiconductor switch being effective to regulate said light load when said auxiliary semiconductor switch is switched ON and OFF.

17. A switching power supply according to claim 16, wherein:

said transformer further includes a tertiary winding; and said tertiary winding replaces said resonance inductance.

* * * * *